(12) United States Patent
Delcourt et al.

(10) Patent No.: US 7,614,125 B2
(45) Date of Patent: Nov. 10, 2009

(54) POSITIVE HOLD TUBE WELD STUD ASSEMBLY

(75) Inventors: Mark H. Delcourt, Richmond, MI (US); Bradley D. Smith, Shelby Township, MI (US)

(73) Assignee: Newfrey LLC, Newark, DE (US)

( * ) Notice: Subject to any disclaimer, the term of this patent is extended or adjusted under 35 U.S.C. 154(b) by 514 days.

(21) Appl. No.: 11/500,249

(22) Filed: Aug. 7, 2006

(65) Prior Publication Data

US 2008/0029582 A1 Feb. 7, 2008

(51) Int. Cl.
*F16B 5/12* (2006.01)
*F16B 5/06* (2006.01)
*F16B 21/00* (2006.01)
*F16B 37/06* (2006.01)

(52) U.S. Cl. .............. 24/662; 24/297; 24/289; 24/293; 411/171; 411/508

(58) Field of Classification Search ............ 411/338, 411/339, 171, 508, 913; 24/662, 297, 618–622
See application file for complete search history.

(56) References Cited

U.S. PATENT DOCUMENTS

| | | | | |
|---|---|---|---|---|
| 3,063,114 A | * | 11/1962 | Perrochat | 24/297 |
| 3,614,815 A | * | 10/1971 | Nysten | 24/662 |
| 3,988,808 A | * | 11/1976 | Poe et al. | 24/297 |
| 4,525,014 A | * | 6/1985 | Holman et al. | 439/92 |
| 4,750,886 A | * | 6/1988 | Portelli et al. | 403/163 |
| 4,799,842 A | | 1/1989 | Kreider et al. | |
| 4,802,803 A | | 2/1989 | Muller | |
| 5,820,323 A | | 10/1998 | Barandun | |
| 5,947,669 A | | 9/1999 | Schäty | |
| 5,991,984 A | | 11/1999 | Schaty | |
| 5,998,756 A | | 12/1999 | Schaty et al. | |
| 6,158,935 A | | 12/2000 | Schäty | |
| 6,205,625 B1 | | 3/2001 | Kato | |
| 6,241,442 B1 | | 6/2001 | Schaty et al. | |
| 6,433,278 B1 | | 8/2002 | Blank et al. | |
| 6,491,487 B1 | | 12/2002 | Wojciechowski | |
| 2005/0097714 A1 | * | 5/2005 | Lipniarski | 24/671 |

* cited by examiner

*Primary Examiner*—Robert J Sandy
(74) *Attorney, Agent, or Firm*—Harness, Dickey & Pierce, P.L.C.

(57) ABSTRACT

A positive hold tube weld stud assembly connectable to a vehicle body panel includes a substantially hollow tubular-shaped body. The body includes an inner body wall defined by a body internal aperture. A raised engagement portion extends inwardly from the inner body wall. A first chamfer positioned proximate an end surface of the body transitions between the inner body wall and the raised engagement portion. A second chamfer transitions between the raised engagement portion and the inner body wall. An insert is partially received in the body internal aperture and is adapted to engage a body connectable device. The insert includes a chamfered stud engagement portion releasably engageable with the second chamfer in an insert installed position.

17 Claims, 4 Drawing Sheets

POSITIVE HOLD TUBE WELD STUD ASSEMBLY

FIELD

The present disclosure relates to tube studs used for example as automobile vehicle trim panel and accessory connectors.

BACKGROUND

The statements in this section merely provide background information related to the present disclosure and may not constitute prior art.

Weld studs are known which are individually welded to a panel of a vehicle such as an automobile for the subsequent connection of devices such as trim components, body parts, electrical cabling, and the like. Common weld studs are solid bodied and generally tubular-shaped, having an enlarged head adapted for welding to the panel. The solid, tubular body is commonly externally threaded or otherwise externally adapted to connect with or receive the device. Additional fastener elements such as nuts are also commonly required to fasten the device to the weld stud.

Common weld studs are not easily adapted for blind installation of the devices due to the common requirement for additional fastener elements for example when the weld studs are externally threaded. Weld studs having hollow internal cavities are known, but include walls that are designed to be collapsible without the capability of internally receiving and engaging a male clip member.

SUMMARY

According to several embodiments a positive hold tube weld stud assembly of the present disclosure connectable to a vehicle body panel includes a weld stud body. The weld stud body includes an inner body wall defined by a body internal aperture. A raised engagement portion extends inwardly from the inner body wall. A first chamfer is positioned proximate an end surface of the body. The first chamfer transitions between the inner body wall and the raised engagement portion. A second chamfer transitions between the raised engagement portion and the inner body wall. An insert is partially received in the body internal aperture and is adapted to engage a body connectable device. The insert includes a chamfered stud engagement portion releasably engageable with the second chamfer in an insert installed position.

According to further embodiments a tube weld stud assembly connectable to a vehicle body panel has a weld stud body including an inner body wall defined by a body internal aperture. A raised engagement portion extends inwardly from the inner body wall. A first chamfer is positioned proximate a first end of the body, the first chamfer defining a transition between the inner body wall and the raised engagement portion. A second chamfer defines a transition between the raised engagement portion and the inner body wall. An insert is partially received in the body internal aperture and is adapted to engage a body connectable device. The insert includes a chamfered stud engagement portion releasably engageable with the second chamfer in an insert installed position. At least one stud engagement sub-portion defined by at least one recess is created in the stud engagement portion. The sub-portion is inwardly deflectable toward a central longitudinal axis of the insert when in sliding contact with the raised engagement portion.

According to still further embodiments, a method is provided for connecting devices using a tube weld stud and an insert to a vehicle body panel. The tube weld stud includes a metal body having an inner body wall defined by a body internal aperture, a raised engagement portion extending inwardly from the inner body wall, a first chamfer positioned proximate a first end of the body, the first chamfer defining a transition between the inner body wall and the raised engagement portion, and a second chamfer defining a transition between the raised engagement portion and the inner body wall comprises a step of orienting a chamfered stud engagement portion of an insert to be received in the body internal aperture. The method includes a step of creating at least one recess in the stud engagement portion to define at least one stud engagement sub-portion. The method further includes a step of aligning the insert with the internal aperture of the tube stud. The method also includes a step of applying an installation force to the insert operable to translate the stud engagement portion in sliding contact with the raised engagement portion and to deflect the sub-portion inwardly toward a central longitudinal axis of the insert. The method still further includes a step of sliding the insert into the tube stud until the chamfered stud engagement portion releasably engages with the second chamfer in an insert installed position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
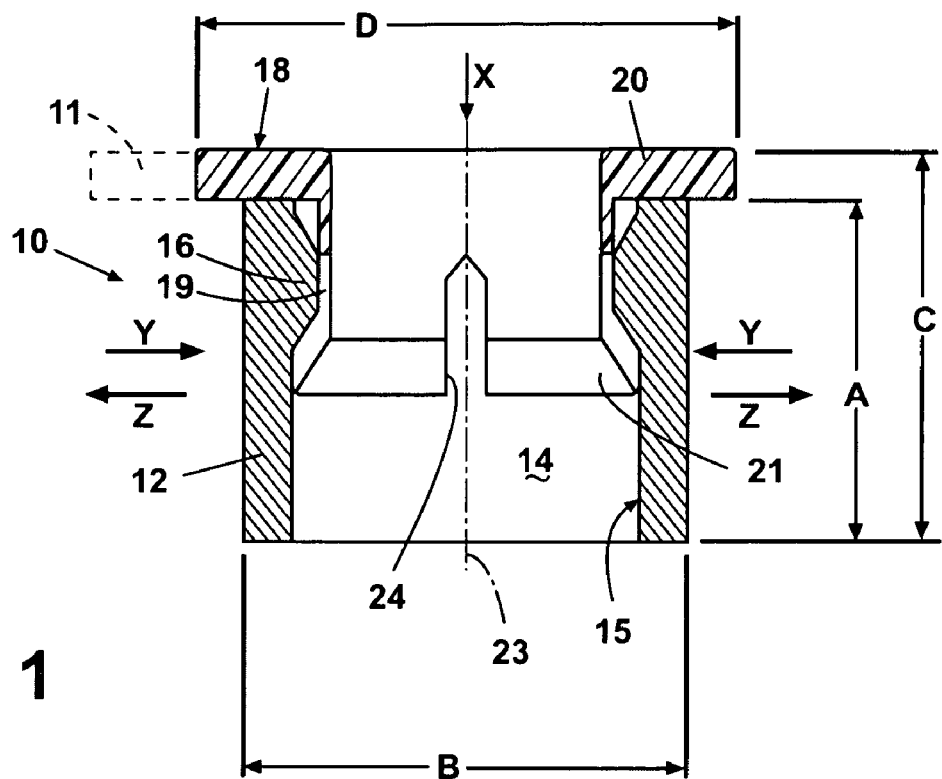
FIG. 1 is a cross-sectional side elevational view of a positive hold tube weld stud of the present disclosure in an assembly having an exemplary installed clip.

The following description is merely exemplary in nature and is not intended to limit the present disclosure, application, or uses. It should be understood that throughout the drawings, corresponding reference numerals indicate like or corresponding parts and features.

According to several embodiments of the present disclosure and referring generally to FIG. 1, a tube weld stud assembly 10 is adapted to receive a connectable device 11 such as, but not limited to a trim panel, an electrical cable, a flexible cover, or the like. Assembly 10 includes a tube weld stud 12 having a major internal aperture 14 defining an internal wall 15 and a raised engagement portion 16 extending inwardly from internal wall 15. An insert 18 is elastically and releasably engaged within the internal aperture 14 and is retained by the engagement portion 16. Insert 18 is shown in a fully inserted, installed position within tube weld stud 12. In the installed position, an insertion end 19 of insert 18 is completely contained within tube weld stud 12, an insert flange 20 abuts an end of tube weld stud 12, and a stud engagement portion 21 retains insert 18 in internal aperture 14 by releasable engagement with engagement portion 16. Insert 18 can be a metal or a polymeric material. Tube weld stud 12 is a metal material allowing tube weld stud 12 to be welded to a panel such as a vehicle body panel which is described in reference to FIG. 6.

Stud engagement portion 21 of insert 18 is initially inserted into tube weld stud 12 by an installation force applied in an installation direction "X" along a central longitudinal axis 23. At least one and in several embodiments a plurality of recesses 24 created in stud engagement portion 21 permit inward contraction of stud engagement portion 21 (toward central longitudinal axis 23) in contact with engagement portion 16 of tube weld stud 12. A perimeter of stud engagement portion 21 initially contracts in exemplary directions "Y" as stud engagement portion 21 passes engagement portion 16. The installation force applied in installation direction "X" is converted to an elastic biasing force when stud engagement portion 21 contracts. This biasing force is available to bias stud engagement portion 21 to radially return to the pre-installation position. After stud engagement portion 21 clears engagement portion 16, stud engagement portion 21 elastically and radially expands to releasably engage engagement portion 16. To remove insert 18, a removal force similar to but applied in a direction opposite to the installation force is applied to insert 18. Modifications can be made to engagement portion 16 and/or to insert 18 to increase or decrease the installation or removal forces.

According to several embodiments, tube weld stud 12 has a body or stud length "A" of approximately 7.0 mm, and a substantially constant stud outer diameter "B" of approximately 9.0 mm throughout stud length "A". Tube weld stud assembly 10 with insert 18 engaged with tube weld stud 12 has an assembly length "C" of approximately 8.0 mm and insert flange 20 of insert 18 has an insert diameter "D" of approximately 11.0 mm. These dimensions are exemplary only and can vary at the discretion of the designer or to suit individual applications for tube weld stud assemblies 10.

Figure 2:
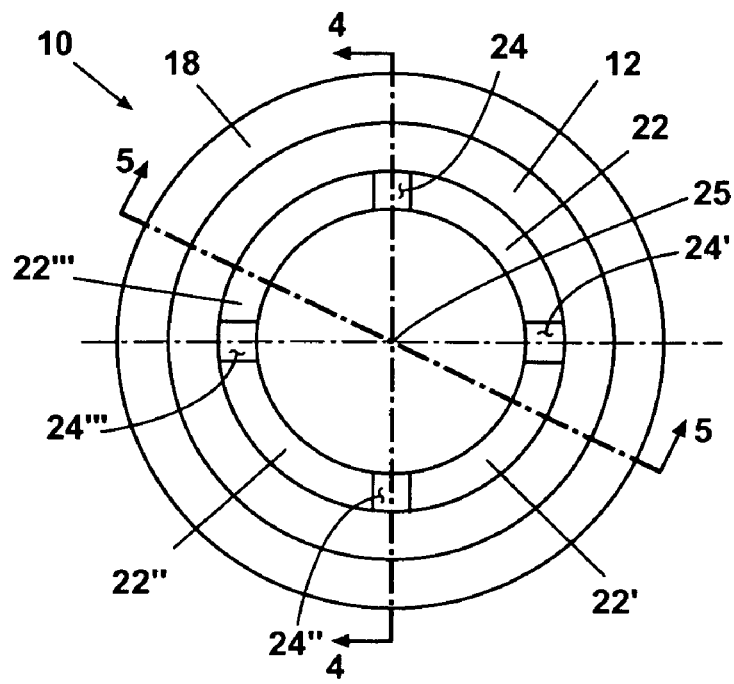
FIG. 2 is a bottom plan view of the assembly of FIG. 1.

Referring now to FIG. 2, according to several embodiments inserts 18 each include at least one stud engagement sub-portion 22 defined by at least one recess 24 created in the stud engagement portion 21, the sub-portion 22 being deflectable when in sliding contact with the raised engagement portion 16. In the embodiment shown, each of a first, second, third, and fourth recess 24, 24', 24", and 24'" are created in stud engagement portion 21. Proximate ones of the recesses, for example first recess 24 and second recess 24' define individual ones of a plurality of sub-portions of stud engagement portion 21. In this example first, second, third, and fourth stud engagement sub-portions 22, 22', 22", and 22'" are created. The skilled practitioner will understand the quantity of sub-portions can be varied by changing the quantity of the recesses and therefore these quantities do not limit the present disclosure. Each of the sub-portions is separately deflectable with respect to a common longitudinal axis 25 of tube weld stud assembly 10.

Figure 3:
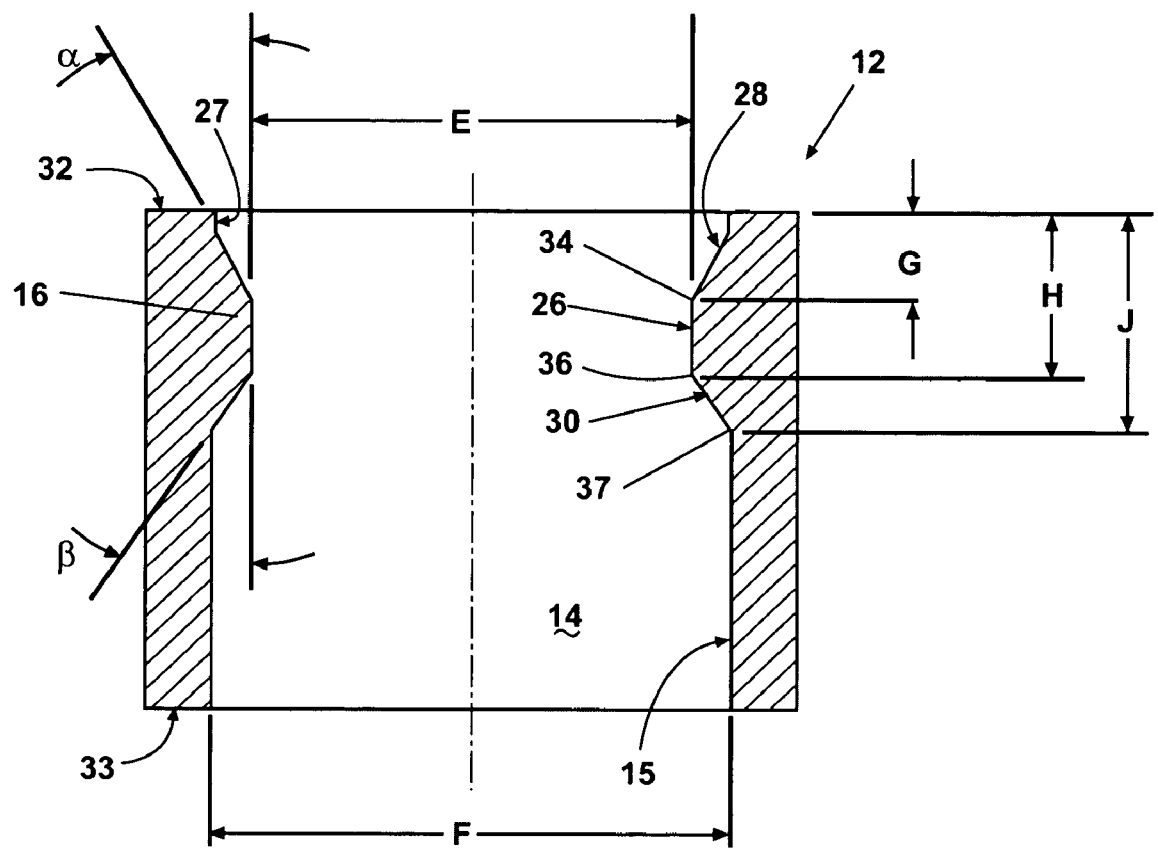
FIG. 3 is a cross-sectional side elevational view of the positive hold tube stud of FIG. 1.

Referring now generally to FIG. 3, engagement portion 16 of tube weld stud 12 includes a throat surface 26 having a throat diameter "E" which creates the maximum compression of stud engagement portion 21 of insert 18 as insert 18 is inserted into tube weld stud 12. Throat surface 26 can be tubular shaped and oriented in alignment with longitudinal axis 23 and substantially parallel to the inner body wall 15. Throat diameter "E" is smaller than an internal aperture diameter "F" defining internal aperture 14. When installing insert 18, insert 18 is initially aligned with a lead-in aperture 27 which in several embodiments is substantially equal to internal aperture diameter "F". First and second chamfers 28, 30 are provided to smoothly transition from lead-in aperture 27 to throat surface 26, and radially outward to internal wall 15. The first or lead-in chamfer 28 acts to compress stud engagement portion 21 during installation. A first end surface 32 is adapted to receive flange 20 of insert 18. A second end surface 33 is positioned opposite to first end surface 32 and is adapted for welding to the vehicle panel. Second end surface 33 can therefore be substantially flat as shown, or can also be tapered, slotted, curved, etc. to suit the end preparation required for the welding operation to be performed.

A first transition area 34 is created at the junction or transition between first chamfer 28 and throat surface 26. First transition area 34 is located at a first transition depth "G" measured from an end surface 32 of tube weld stud 12. A second transition area 36 is created where throat surface 26 transitions to second chamfer 30. Second chamfer 30 allows stud engagement portion 21 to smoothly, radially expand until stud engagement portion 21 reaches a third transition area 37. Third transition area 37 is created where second chamfer 30 transitions to internal wall 15 of internal aperture 14. Second transition area 36 is positioned at a second transition depth "H" measured from first end surface 32. Similarly, third transition area 37 is positioned at a total throat region depth "J" also measured from first end surface 32.

First chamfer 28 defines an angle α and second chamfer 30 defines an angle β with respect to throat surface 26. Angle α can be equal to or different than angle β. Angles α and β can also be varied at the discretion of the manufacturer or at the request of the user to increase or decrease the installation and/or removal forces of insert 18.

Figure 4:
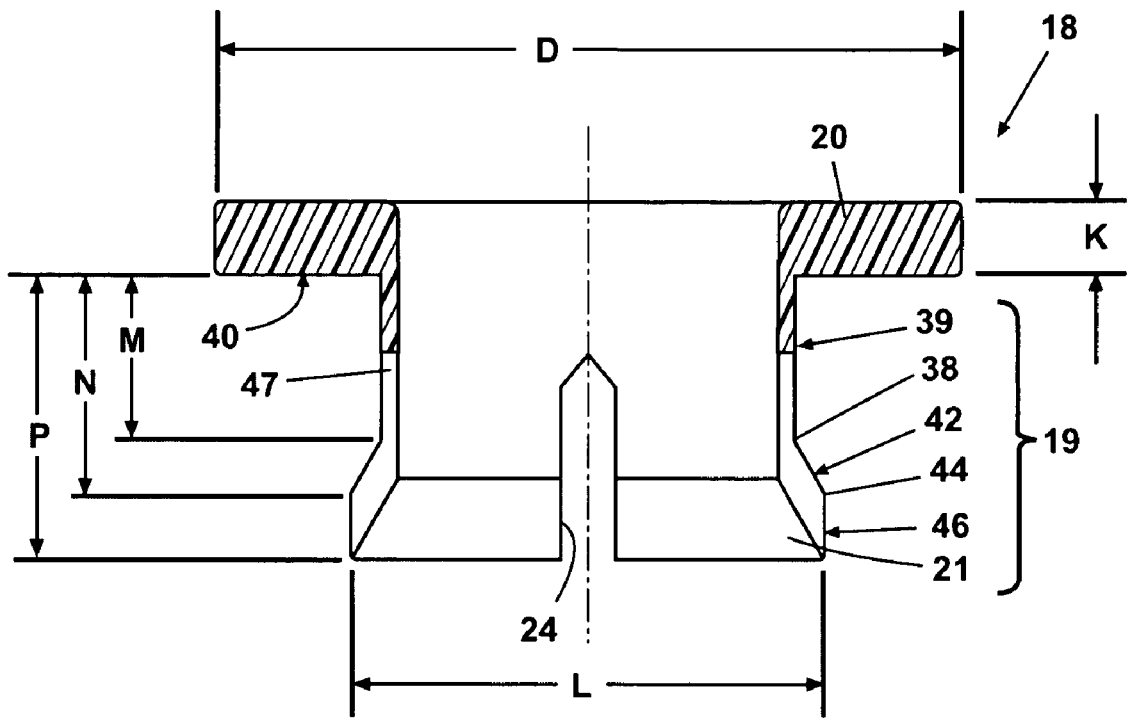
FIG. 4 is a cross-sectional side elevational view of the clip taken at section 4-4 of FIG. 2.

Referring now to FIG. 4, in several embodiments insert 18 includes an outer wall surface 39 which is oriented substantially perpendicular to a flange surface 40 of insert flange 20. Insert flange 20 includes a flange thickness "K" which in several embodiments can be approximately 1.0 mm. A neck transition 38 is created between outer wall surface 39 and a stud engagement chamfer 42. A stud engagement chamfer 42 extends radially outwardly from outer wall surface 39. A wall transition 44 is created between stud engagement chamfer 42 and an extended wall 46 of stud engagement portion 21. Extended wall 46 is substantially parallel to internal aperture 14. Extended wall 46 also includes a stud engagement diameter "L" which according to several embodiments is substantially equal to internal aperture diameter "F". Stud engagement diameter "L" can also be a smaller or larger diameter than internal aperture diameter "F" to either decrease or increase the installation or removal forces or the biasing force provided by stud engagement portion 21 in contact with internal wall 15 of tube weld stud 12.

Neck transition 38 is positioned at a neck transition length "M" measured from flange surface 40. Similarly, wall transition 44 is positioned at a wall transition length "N" from flange surface 40. Finally, insertion end 19 of insert 18 extends to a total insertion end length "P" measured from flange surface 40. According to several embodiments, neck transition length "M" is substantially equal to second transition depth "H" and wall transition length "N" is substantially equal to total throat region depth "J". An insertion end tubular wall 47 having outer wall surface 39 extends between flange surface 40 and stud engagement portion 21. Each recess 24 is created through stud engagement portion 21 and also extends at least partially into tubular wall 47 to permit deflection of stud engagement portion 21 to be at least partially accommodated in tubular wall 47.

Figure 5:
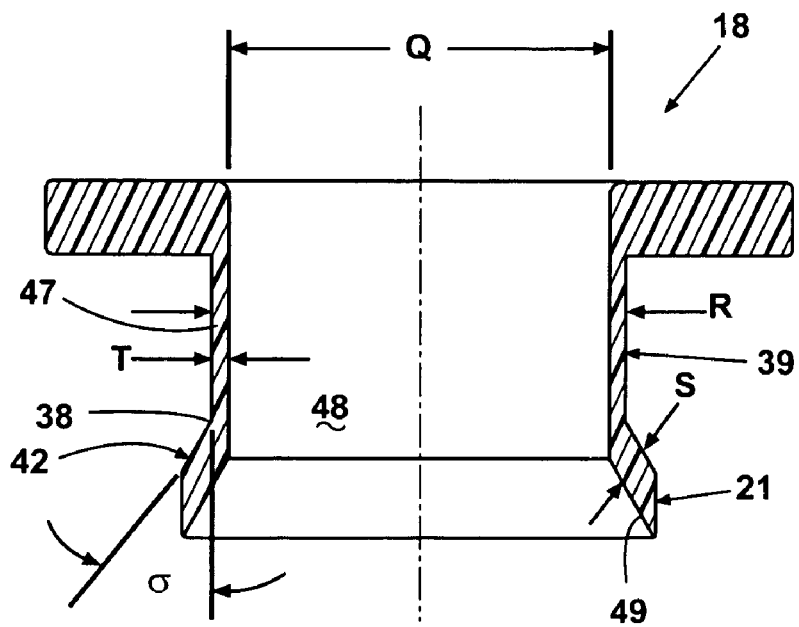
FIG. 5 is a cross-sectional side elevational view of the clip taken at section 5-5 of FIG. 2.

As best seen in reference to FIG. 5, a through-aperture 48 is defined through insert 18 having an internal diameter "Q". Outer wall surface 39 defines an outer wall diameter "R". In several embodiments, outer wall diameter "R" is substantially equal to throat diameter "E" or can be smaller than throat diameter "E" to provide sliding clearance for outer wall surface 39 with respect to throat surface 26. Stud engagement chamfer 42 defines a third chamfer oriented at an angle δ with respect to outer wall surface 39. According to several embodiments, angle δ is substantially equal to angle β of second chamfer 30. In the fully inserted, installed position of insert 18 (shown in FIG. 1), stud engagement chamfer 42 is positioned to substantially abut second chamfer 30 of tube weld stud 12. Second chamfer 30 therefore inhibits release of insert 18 unless a removal force substantially equal to the installation force is applied to remove insert 18. According to several additional embodiments, angle δ is different from angle β of second chamfer 30 which allows the removal force to be varied from the installation force.

Engagement portion 21 has an outwardly sloping interior wall surface 49 oppositely positioned from stud engagement chamfer 42, together defining a wall thickness "S", which in several embodiments is greater than a wall thickness "T" of tubular wall 47. The greater wall thickness "S" of stud engagement portion 21 acts to cause bending or deflection to primarily occur at neck transition 38 and in tubular wall 47, preventing yielding or permanent deflection of stud engagement portion 21. The angle δ is therefore retained after elastic return to the pre-deflected condition of stud engagement portion 21, which maximizes engagement of stud engagement portion 21 with second chamfer 30 of tube weld stud 12.

Figure 6:
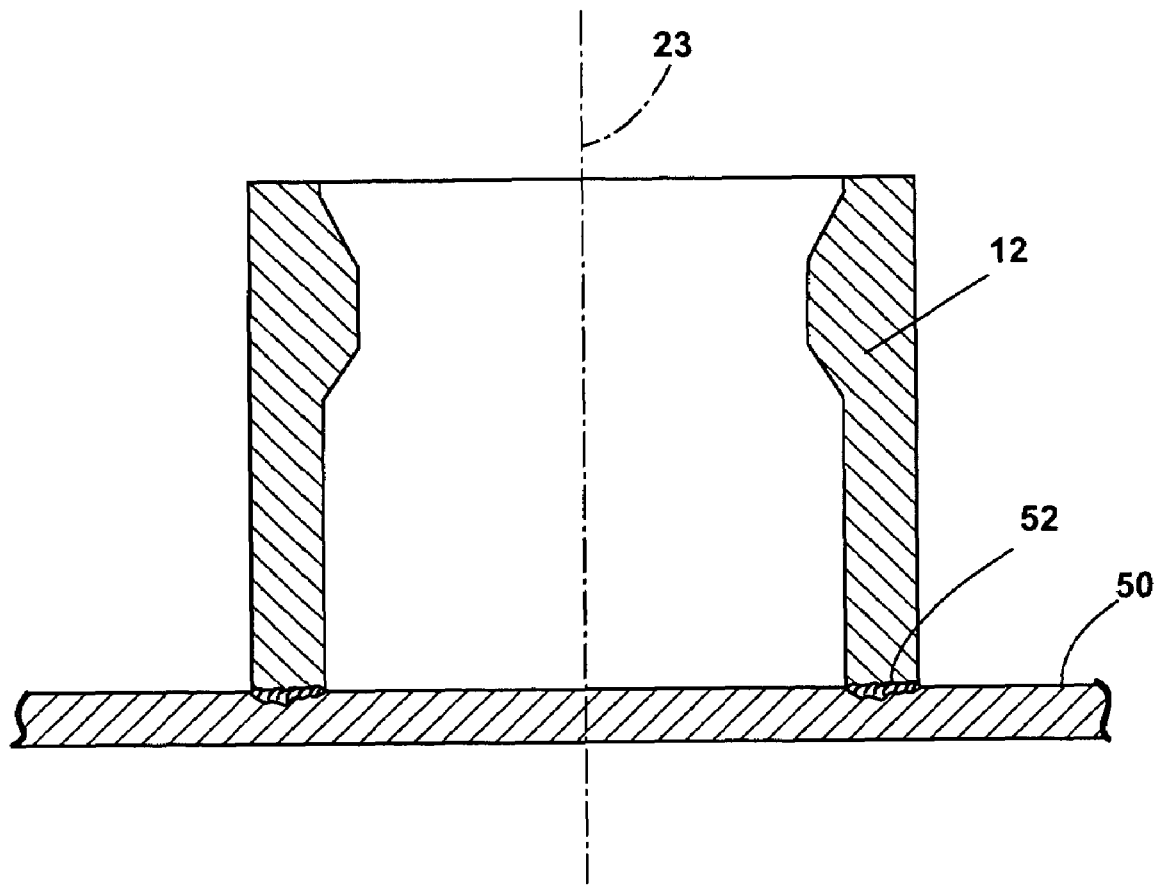
FIG. 6 is a cross-sectional side elevational view of the positive hold tube weld stud of the present disclosure welded to a vehicle panel.

Referring now to FIG. 6, tube weld studs 12 of the present disclosure are created of a metal material suitable for welding to a metal panel 50 of for example an automobile vehicle. The material can be a steel, stainless steel, aluminum, or the like. Tube weld studs 12 can be welded to panel 50 using for example a stud welding gun (not shown) or other welding processes to create a weld joint 52 where second end surface 33 of tube weld stud 12 contacts panel 50. In several embodiments tube weld stud 12 is oriented substantially perpendicular to a plane defined by panel 50.

Referring again to both FIGS. 1 and 6, insert 18 can be installed either after or before tube weld stud 12 is welded to panel 50. Insert 18 can be also be pre-connected to an item such as a trim panel of the vehicle (not shown) allowing inserts 18 to connect the trim panel to the vehicle after tube weld studs 12 are connected to panel 50. Insert 18 can be a polymeric material such as but not limited to a polyamide material. In several embodiments, insert 18 is pre-inserted in tube weld stud 12 prior to welding tube weld stud 12 to panel 50. For these embodiments, insert 18 can be a metal material suitable for the temperatures of welding, or insert 18 can also be a high temperature polymeric material such as a high temperature polyamide material, allowing insert 18 to be pre-installed before the welding procedure. The stand-off distance between insert 18 and weld joint 52 provided by controlling total neck length "P" of insert 18 allows the use of heat resistant polymeric materials for insert 18 if insert 18 is pre-installed prior to the welding procedure.

Tube weld stud assemblies 10 of the present disclosure are not limited to the dimensions provided herein. Tube weld stud 12 can be longer or shorter than the dimensions identified herein or can also have a larger or smaller stud diameter "B" at the discretion of the designer. In addition, the geometry of insert 18 can be modified for insert flange 20 to allow multiple applications of inserts 18 for example to connect to trim panels, having loops to engage electrical cabling, or adapted to engage additional or separate panels, etc. The present disclosure is therefore not limited by the shape or the item to be connected to insert flange 20. Tube weld studs 12 and inserts 18 of the present disclosure can also be shaped in other geometric patterns other than circular as described herein, including but not limited to oval, square, rectangular, triangular, hexagonal, and the like.

Tube weld stud assemblies 10 of the present disclosure provide several advantages. By positioning the engagement portion 16 internal to tube weld studs 12, and configuring the stud engagement portion 21 to allow for elastic contraction and expansion, second chamfer 30 of tube weld stud 12 provides a positive retention capability to maintain insert 18 in contact with engagement portion 16 within tube weld stud 12. The angles α and β created for first and second chamfers 28 and 30 and the angle δ of stud engagement chamfer 42 can be varied to suit different materials of both tube weld stud 12 and insert 18, as well as to increase and/or decrease the insertion or removal forces needed to slide stud engagement portion 21 past engagement portion 16. Also, by spacing insert 18 distally apart from weld joint 52 to control the temperature of insert 18 during the welding process, insert 18 can be pre-installed in tube weld stud 12 prior to the welding operation at the discretion of the designer or user. Tube weld stud assemblies 10 of the present disclosure also allow for blind installation of inserts 18 into tube weld studs 12 which promote pre-assembly of inserts 18 into the component to be connected. The smooth outer wall of tube weld studs of the present disclosure permits the studs to be automatically fed to a stud welding gun (not shown) for stud welding with or without the insert 18.

What is claimed is:

1. A tube weld stud assembly connectable to a vehicle body panel, comprising:
    a substantially hollow, tubular-shaped body, including:
        an inner body wall defined by a body internal aperture;
        a raised engagement portion extending inwardly from the inner body wall;
        a first chamfer positioned proximate an end surface of the body, the first chamfer transitioning between the inner body wall and the raised engagement portion;
        a second chamfer transitioning between the raised engagement portion and the inner body wall; and
        an outer wall surface having a constant outer diameter throughout a length of the body, and a first end surface; and
    an insert partially received in the body internal aperture, the insert including:
        a chamfered stud engagement portion releasably engageable with the second chamfer in an insert installed position; and
        an insert flange having a flange surface oriented substantially perpendicular to the outer wall surface, the flange surface abutting the first end surface in an installed position of the insert.

2. The tube weld stud of claim 1, wherein the engagement portion further comprises a tubular-shaped surface oriented substantially parallel to the inner body wall.

3. The tube weld stud of claim 2, wherein:
    the first chamfer defines a first angle with the tubular-shaped surface; and
    the second chamfer defines a second angle with the tubular-shaped surface.

4. The tube weld stud of claim 3, wherein the second angle is substantially equal to the first angle.

5. The tube weld stud of claim 3, wherein the second angle is different from the first angle.

6. The tube weld stud of claim 3, wherein the chamfered stud engagement portion further comprises:
   a third chamfer defining a third angle;
   wherein the third angle is substantially equal to the second angle.

7. The tube weld stud of claim 1, wherein the insert further comprises:
   an insertion end completely received within the body internal aperture, the insertion end including a stud engagement portion releasably engaged to the raised engagement portion;
   an insertion end tubular wall having an outer wall surface extending between the flange surface and the stud engagement portion, the insertion end tubular wall having a diameter smaller than a diameter of the stud engagement portion; and
   the insert flange being homogenously created with the insertion end, the insert flange positionable completely outside the body in the insert installed position.

8. The tube weld stud of claim 7, wherein the insertion end comprises a tubular wall having an outer wall surface adapted to be slidingly received by the raised engagement portion.

9. The tube weld stud of claim 7, wherein the insert further comprises at least one stud engagement sub-portion defined by at least one recess created in the stud engagement portion, the sub-portion inwardly deflectable toward a central longitudinal axis of the insert when in sliding contact with the raised engagement portion.

10. The tube weld stud of claim 1, wherein the body comprises:
    a metal material adaptable for welding; and
    a second end surface positioned opposite to the first end surface and having a shape adapted to create a weld joint at the second end surface.

11. A tube weld stud assembly connectable to a vehicle body panel, comprising:
    a body, including:
      an inner body wall defined by a body internal aperture;
      a raised engagement portion extending inwardly from the inner body wall toward a central longitudinal axis of the body;
      a first chamfer positioned proximate a first end of the body and transitioning between the inner body wall and the raised engagement portion; and
      a second chamfer oppositely positioned about the raised engagement portion from the first chamfer and operable to transition from the raised engagement portion to the inner body wall; and
    an insert partially received in the body internal aperture, the insert including:
      a chamfered stud engagement portion releasably engageable with the second chamfer in an insert installed position; and
      at least one stud engagement sub-portion defined by at least one recess created in the stud engagement portion, the sub-portion inwardly deflectable toward a central longitudinal axis of the insert when in sliding contact with the raised engagement portion.

12. The tube weld stud assembly of claim 11, wherein the body further comprises:
    a first end surface adapted to receive the insert; and
    a second end surface opposed to the first end surface and adapted for welding the tube stud.

13. The tube weld stud assembly of claim 12, wherein the insert further comprises:
    a flange adapted to contact the first end surface; and
    a tubular wall extending substantially perpendicular to the flange.

14. The tube weld stud assembly of claim 13, further comprising:
    a first wall thickness of the stud engagement portion; and
    a second wall thickness of the tubular wall;
    wherein the first wall thickness is greater than the second wall thickness operably inducing deflection of the sub-portion in the tubular wall.

15. The tube weld stud assembly of claim 13, further comprising:
    a first transition of the first chamfer defined between the inner body wall and the raised engagement portion; and
    a second transition of the second chamfer defined between the raised engagement portion and the inner body wall.

16. The tube weld stud assembly of claim 15, wherein the insert further comprises a neck transition defined between the stud engagement portion and the tubular wall, wherein the neck transition is positioned proximate to the second transition in the insert installed position.

17. The tube weld stud assembly of claim 11, further comprising:
    a metal material adaptable for welding used for the tube stud body; and
    a polymeric material used for the insert.

* * * * *